June 24, 1930. J. F. ZEILINGER 1,765,392
WEEDER
Filed March 11, 1929
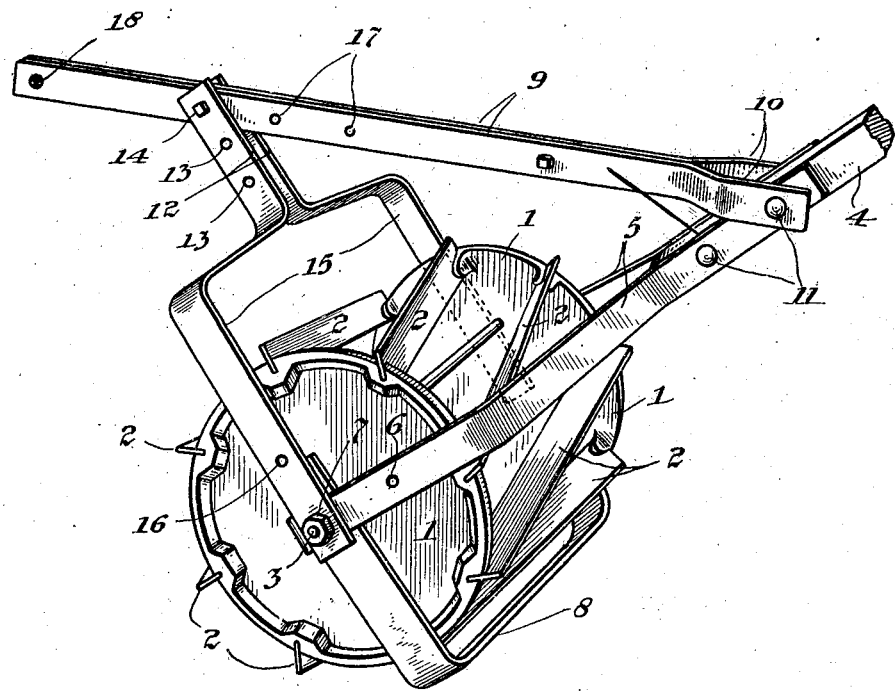
INVENTOR.
John F. Zeilinger
BY
Brayton Richards
ATTORNEY.

Patented June 24, 1930

1,765,392

UNITED STATES PATENT OFFICE

JOHN F. ZEILINGER, OF DAVID CITY, NEBRASKA, ASSIGNOR TO THE BARKER MANUFACTURING COMPANY, INC., OF DAVID CITY, NEBRASKA, A CORPORATION OF NEBRASKA

WEEDER

Application filed March 11, 1929. Serial No. 345,962.

The invention relates to improvements in weeders, especially adapted for use in cultivating gardens, fields and the like, the primary object of the invention being to provide an improved attachment for implements of this character by means of which the same may be readily hitched or connected with a tractor, horse, or other means of locomotion.

Another object of the invention is the provision of an attachment of the character indicated which is capable of economical construction and highly efficient in use.

Another object of the invention is to provide a construction of the character indicated which is capable of adjustment to various conditions of use.

Other objects will appear hereinafter.

The invention consists in the combinations and arrangements of parts hereinafter described and claimed.

The invention will be best understood by reference to the accompanying drawing forming a part of the specification and which is a perspective view of a garden weeder equipped with a hitching attachment embodying the invention.

The preferred form of construction, as illustrated in the drawing, comprises a cultivating reel having end discs peripherally connected by inclined cultivating blades 2 and having central trunnions 3 at each end. A handle bar 4 is connected to the said reel by means of a yoke consisting of two divergent arms 5 having a plurality of perforations 6 adapted and arranged to fit over the trunnions 3 and held in place thereon by means of nuts 7. Co-operating with said reel is also a weeder bar 8 attached as indicated to the trunnions 3.

The hitch bar 9 is composed of two longitudinal strips which are separated at their rear ends to form a yoke 10 fitting over the handle bar 4 and adjustably and pivotally secured thereto by means of the bolts 11. The hitch bar 9 is supported by means of a supporting bail consisting of two parallel strips 12 having registering perforations 13 for the reception of a securing bolt 14, said parallel strips being adapted and arranged to fit over opposite sides of the hitch bar 9, as shown.

The strips 12 are provided at their lower ends with divergent supporting arms 15 embracing opposite ends of the cultivating reel and having a plurality of perforations 16 adapted and arranged to fit over the trunnions 3, thereby providing a pivotal and adjustable connection therewith. The hitch bar 9 is provided with a plurality of bolt perforations 17 for adjustably receiving the bolt 14 and thus effecting adjustable connection with the supporting strips 12 to suit the variable conditions of use. The hitch bar 9 is provided at its forward end with a transverse perforation 18 by means of which the same may be readily attached to a tractor, horse, or other means of locomotion.

By this arrangement a simple and effective hitching attachment for implements is provided which is capable of economical construction and highly efficient in use.

While I have illustrated and described the preferred form of construction for carrying the invention into effect, this is capable of variation and modification without departing from the spirit of the invention. I therefore do not wish to be limited to the precise details disclosed, but would desire to avail myself of the various variations and modifications as fall within the scope of the appended claims.

Having thus fully described my invention, what I claim as new and desire to secure by Letters Patent is:

1. An implement of the class described comprising a rotary reel arranged to travel along the ground and having at its periphery a plurality of cutting blades; trunnions provided at the ends of said reel; a handle pivotally connected with said trunnions; a hitch bar pivotally connected with said handle and projecting over said reel; and a support for said hitch bar pivotally connected therewith and with the trunnions of said reel.

2. An implement of the class described comprising a reel having end discs connected by inclined cutting blades; trunnions on said end discs; a handle bar provided at its lower end with a yoke having divergent arms pivotally and adjustably connected with said trunnions; a hitch bar pivotally and adjustably connected with said handle bar and extending over said reel, there being means for effecting a connection with the forward end of said hitch bar; and a supporting bail pivotally and adjustably connected with said hitch bar and with the trunnions of said reel.

3. An implement of the class described comprising a rotary element arranged to travel along the ground; trunnions provided at the ends of said element; a handle pivotally connected with said trunnions; a hitch bar pivotally connected with said handle and projecting over said reel; and a support for said hitch bar pivotally connected therewith and with the trunnions of said reel.

4. An implement of the class described comprising a rotary member arranged to travel along the ground; trunnions provided at the ends of said rotary member; a handle pivotally connected with said trunnions; a hitch bar pivotally connected with said handle and projecting over said reel; and a support for said hitch bar pivotally and adjustably connected therewith and with the trunnions of said reel.

In witness whereof, I have hereunto set my hand this 7th day of March, 1929.

JOHN F. ZEILINGER.